(12) United States Patent
Boutteville et al.

(10) Patent No.: US 7,318,361 B2
(45) Date of Patent: Jan. 15, 2008

(54) THRUST RETURN MECHANISM

(75) Inventors: Olivier Boutteville, Toulouse (FR); Michel Collet, Toulouse (FR); Wim Teulings, Fontenilles (FR)

(73) Assignee: Siemens VDO Automotive, Toulouse (FR)

( * ) Notice: Subject to any disclaimer, the term of this patent is extended or adjusted under 35 U.S.C. 154(b) by 463 days.

(21) Appl. No.: 10/499,729

(22) PCT Filed: Dec. 2, 2002

(86) PCT No.: PCT/EP02/13579

§ 371 (c)(1), (2), (4) Date: Jun. 21, 2004

(87) PCT Pub. No.: WO03/052538

PCT Pub. Date: Jun. 26, 2003

(65) Prior Publication Data

US 2005/0016322 A1 Jan. 27, 2005

(30) Foreign Application Priority Data

Dec. 19, 2001 (FR) .................................. 01 16476

(51) Int. Cl.
G05G 1/04 (2006.01)
(52) U.S. Cl. .......................................... 74/518; 74/512
(58) Field of Classification Search ................. 74/512, 74/513, 514, 516, 517, 518, 505, 506, 560; 474/70, 148
See application file for complete search history.

(56) References Cited

U.S. PATENT DOCUMENTS

| | | | | |
|---|---|---|---|---|
| 2,271,663 A * | 2/1942 | Rubissow | ..................... | 74/513 |
| 4,006,441 A * | 2/1977 | Goodrich | ..................... | 338/153 |
| 4,224,832 A * | 9/1980 | Prohaska et al. | ......... | 74/388 R |
| 4,380,799 A | 4/1983 | Allard et al. | | |
| 4,428,542 A * | 1/1984 | Kobayashi et al. | ...... | 242/388.8 |
| 4,602,801 A * | 7/1986 | Vincent | ................. | 280/11.115 |
| 4,631,033 A * | 12/1986 | Menne | ......................... | 440/7 |
| 4,870,871 A * | 10/1989 | Ivan | .......................... | 74/513 |
| 5,309,361 A * | 5/1994 | Drott et al. | ..................... | 701/1 |
| 5,497,677 A * | 3/1996 | Baumann et al. | ............. | 74/513 |
| 5,568,797 A | 10/1996 | Landerretche | | |
| 6,020,875 A * | 2/2000 | Moore et al. | ............... | 345/156 |
| 6,070,490 A * | 6/2000 | Aschoff et al. | ............... | 74/513 |
| 6,202,779 B1 * | 3/2001 | Musat | ........................ | 180/170 |
| 6,293,584 B1 * | 9/2001 | Levine | ...................... | 280/735 |
| 2005/0016318 A1 * | 1/2005 | Allard et al. | ................ | 74/512 |

FOREIGN PATENT DOCUMENTS

| | | |
|---|---|---|
| EP | 0 849 108 | 6/1998 |
| FR | 2 460 224 | 1/1981 |
| FR | 2 685 667 | 7/1993 |
| JP | 05-231194 | 9/1993 |
| WO | 01/89872 | 11/2001 |

* cited by examiner

Primary Examiner—Richard Ridley
Assistant Examiner—Matthew A. Johnson
(74) Attorney, Agent, or Firm—Young & Thompson

(57) ABSTRACT

The thrust return mechanism (4) is intended for a thrust return pedal. It includes an electric motor (28) for the positioning of a control member (30) by the intermediary of transmission elements. The transmission elements include at least one cable (48, 52) of which one end is fixed to a first pulley (42, 54) and which is then wound around a second pulley (40, 50) and of which the second end is fixed on the first pulley (42, 54).

12 Claims, 5 Drawing Sheets

THRUST RETURN MECHANISM

CROSS REFERENCE TO RELATED APPLICATION

This is the 35 USC 371 national stage of international application PCT/EP02/13579, filed on Dec. 2, 2002, which designated the United States of America.

FIELD OF THE INVENTION

The present invention relates to a thrust return mechanism intended to equip a-thrust return pedal.

BACKGROUND OF THE INVENTION

A thrust return pedal is used in the field of driving assistance for a motor vehicle and therefore serves as an interface between the vehicle and its driver.

This type of pedal is for example used in the field of speed regulation. There are regulators which automatically manage the speed of the vehicle. It therefore suffices to select a cruising speed and an electronic management system ensures that the vehicle is kept at this speed. Speed regulation can also be carried out by creating a hard point during the depression of the accelerator pedal. When the set speed is then reached, the driver feels a hard point in this pedal and he thus knows that the set speed has been reached.

The thrust return pedal acts in this case like a luminous or audible alarm which warns the driver. The driver is then free to take note or not to take note of this alarm. This type of information means has the advantage of being perceived only by the driver and not by the other passengers.

The document FR 2 685 667 discloses a thrust return pedal. A thrust return mechanism comprising a motor reduction unit controls the movement of a lever that cooperates with a spring. Depending on the position of the lever, the spring applies a greater or lesser traction force tending to return the control pedal to its position of rest.

The document FR 2 460 224 also discloses a speed regulator device for a motor vehicle comprising a control pedal in which a hard point is felt by the user at two thirds of the travel of the pedal. The thrust return mechanism used here utilizes an epicyclic train.

The mechanisms used have the disadvantage of being of relatively large size, of high cost price and of limited rapidity.

At present, in certain motor vehicles, the accelerator pedal is part of a module that is simply screwed onto the floor of the vehicle and connected electrically. This makes it possible to have a simple and rapid assembly of the accelerator pedal. The large size of the thrust return mechanisms of the prior art prohibits any integration of such a mechanism in an accelerator pedal module.

SUMMARY OF THE INVENTION

The purpose of the present invention is therefore to provide a thrust return mechanism of small size in order to be able to integrate this mechanism in an accelerator pedal module without obstructing the adjacent brake pedal.

For this purpose, the mechanism that it proposes is a thrust return mechanism intended for a thrust return pedal, comprising an electric motor for the positioning of a control member by the intermediary of transmission means.

According to the invention, the transmission means comprise at least one cable of which one end is fixed to a first pulley and which is then wound around a second pulley and of which the second end is fixed on the first pulley.

The use of cables in the transmission has several advantages. This solution firstly makes it possible to have a mechanism of small size. In fact it is not so much due to the compactness of the transmission means that the overall size can be small but due to the fact that the use of cables makes it possible to limit the friction losses in the transmission. Thus, the motor used can be a less powerful motor and one of restricted size. Furthermore, the reduction can be minimal, which makes it possible for the mechanism to have very short reaction times. The flexibility of cables also makes it possible to make best possible use of the available space since is it very easy to achieve reversals of motion with a cable. Finally, such a transmission is as reliable as gears and requires no maintenance.

In order to limit the slipping of the cable over the second pulley, said cable is preferably wound by at least two turns around said pulley. For the same purpose, it is possible to give the cable an extra thickness disposed in a corresponding recess formed at the periphery of the second pulley.

A preferred embodiment ensures that each cable end is provided with an end-piece placed in a corresponding recess formed at the periphery of the first pulley.

For better transmission of the motor's movement, means are advantageously provided for tensioning the cable. According to one embodiment of these tensioning means, the first pulley is a double pulley consisting of two twin pulleys, each cable end is fixed on a separate twin pulley and elastic means act in a torsional manner between the two twin pulleys in order to tension the cable.

The present invention also relates to a thrust return pedal comprising a control device having a control member that moves between a raised position of rest and a position of maximum depression, return means of the control device returning the control member to its position of rest, and a thrust return mechanism designed to create a hard point during the depression of the control member in which the thrust return mechanism is a mechanism such as described above.

The use of such a thrust return mechanism is particularly advantageous in a thrust return pedal in which the thrust return mechanism acts on the control device by the intermediary of connection means that are unidirectional in the same direction as the return means of the control device, the unidirectional connection prohibiting any action of the thrust return mechanism on the control device in the direction opposite to the direction of action of the return means.

BRIEF DESCRIPTION OF THE DRAWINGS

The details and advantages of the present invention will become more apparent from the following description, given with reference to the appended diagrammatic drawing in which.

DETAILED DESCRIPTION OF THE INVENTION

Figure 1:
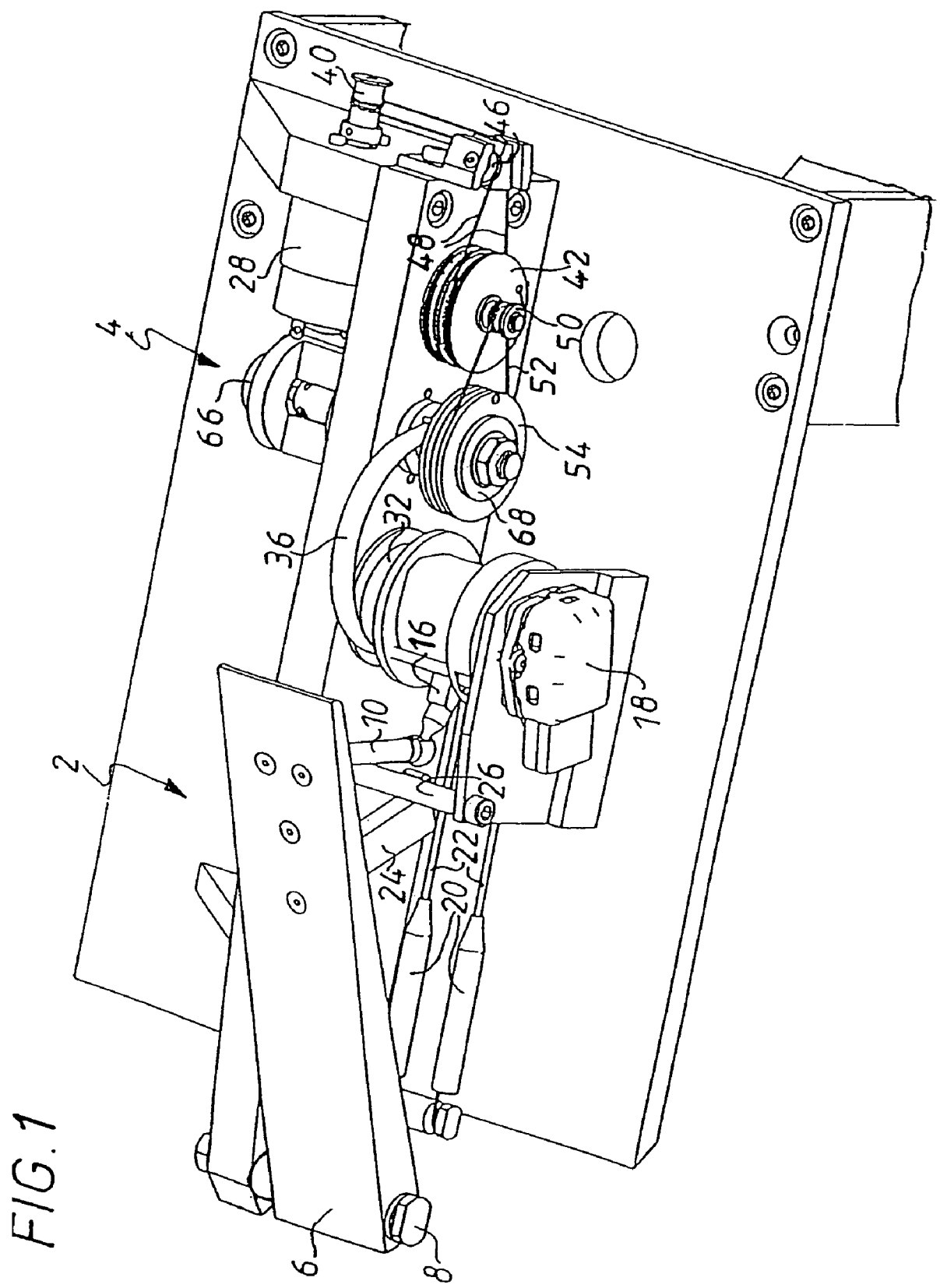
FIG. 1 is a perspective view of a thrust return pedal according to the invention.

The thrust return pedal shown in the drawing comprises, on the one hand, an actuating mechanism 2, hereafter also referred to as a control device, and, on the other hand, a thrust return mechanism 4. These two mechanisms are connected by a unidirectional connection described below and are both mounted on the same support.

The actuating mechanism 2 is a mechanism known to those skilled in the art. Such mechanisms are mounted in series on many motor vehicles.

The control device shown in the drawing comprises a control pedal 6 mounted such that it pivots about a spindle 8. At its end opposite to that of the spindle 8, the pedal is connected by the intermediary of a ball joint to a connecting rod 10 in order to act on a ring 12 mounted such that it pivots about a fixed spindle 14. The connection between the connecting rod 10 and the ring 12 is also made by means of a ball joint articulated at the end of an arm 16 integral with the ring 12. By means of this connection, when the control pedal 6 pivots about the spindle 8, it induces a rotation of the ring 12 about its fixed spindle 14. A Hall effect position sensor 18 is mounted on the fixed spindle 14 and measures the position of the ring 12 with respect to that fixed spindle 14.

Figure 2:
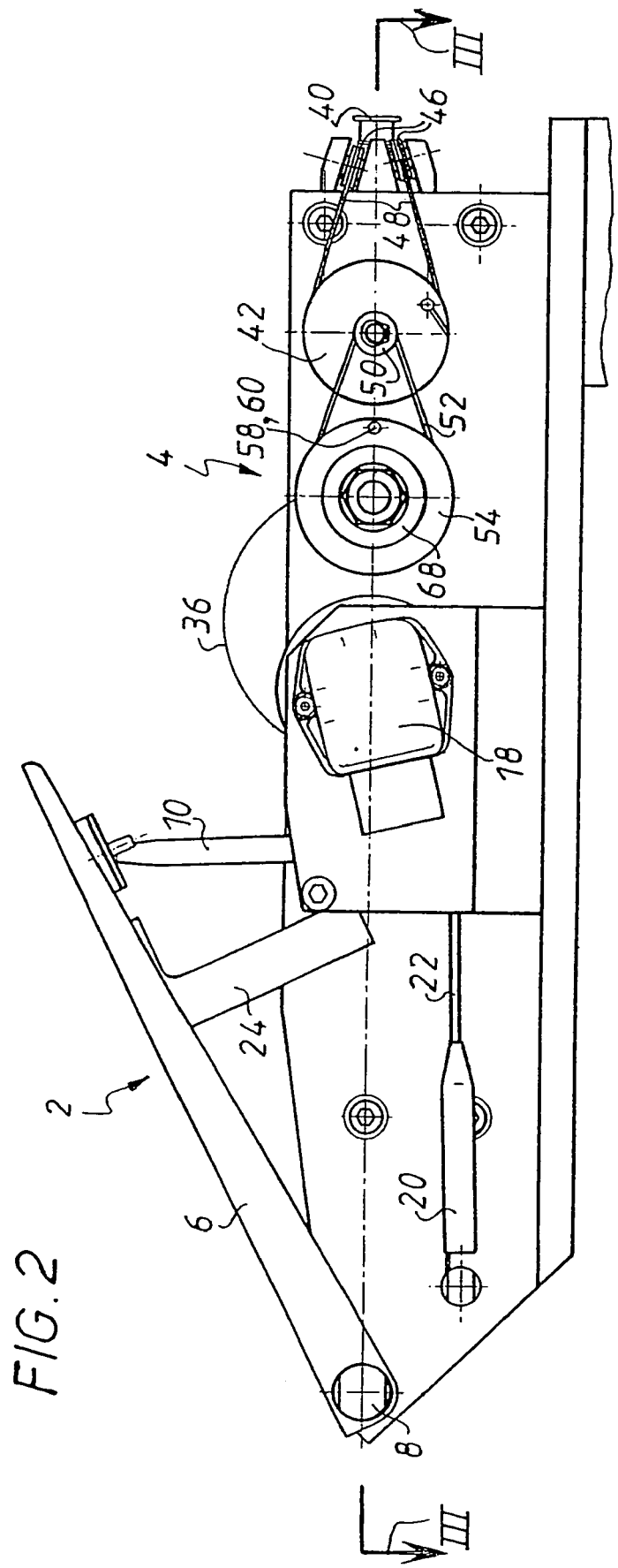
FIG. 2 is a side view of the device shown in FIG. 1.
Figure 3:
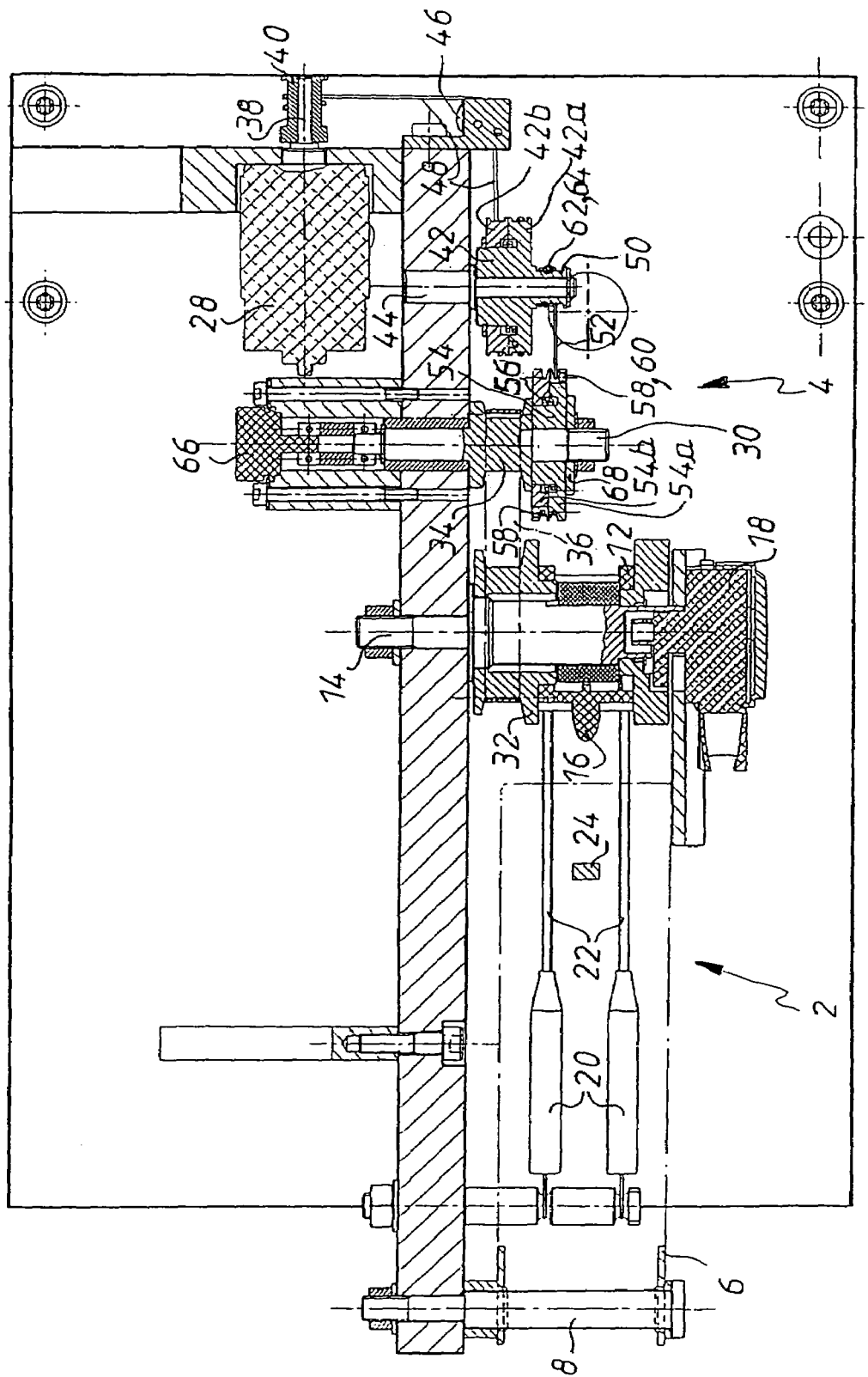
FIG. 3 is a cross-sectional view along the line III-III of FIG. 2.

Two return springs 20 act on the ring 12 in order to bring the latter back to the position of rest, corresponding to the position assumed by the actuating mechanism when no thrust is applied to the control pedal 6. The return springs 20 act on the ring 12 by the intermediary of cables 22 fixed to the ring 12 at one of their ends, each of the other ends being fixed to a return spring 20. Each return spring 20 is furthermore attached to a fixed point of the support of the thrust return pedal. In the drawing, the return springs act on the ring 12 and tend to make the latter rotate in the clockwise direction (seen in the same direction as in FIG. 2).

The position of rest of the control pedal 6 is defined (FIG. 2) by a hook 24 fixed under the control pedal 6 and cooperating with a fixed stop 26. As the connections between the ring 12 and the control pedal 6 are ball joints, the forces applied by the cables 22 and the springs 20 to the ring 12 are retransmitted to the control pedal 6 and vice-versa (apart from the slight friction losses of the ball joints).

The actuating mechanism such as described above corresponds to a conventional mechanism. The driver of the corresponding motor vehicle acts on the control pedal 6. In the rest of the description it is considered that this control pedal is an accelerator pedal. Depending on the power that the engine must deliver, the driver depresses the control pedal 6 to a greater or lesser degree. The position sensor 18 makes it possible to know exactly the position of this control pedal 6 and its depression. This information is then supplied to an engine management device and is used for regulating, for example, the angle of opening of a fresh air inlet butterfly valve.

The thrust return mechanism 4 comprises an electric motor 28 used for adjusting the position of a pivoting spindle 30. The latter is parallel with the fixed spindle 14. Each of these spindles 14, 30 carries a pulley, 32 and 34 respectively, the two pulleys facing each other. The pulley 32 mounted on the fixed spindle 14 is integral with the ring 12 whilst the pulley 34 forms only a single part with the pivoting spindle 30. The two pulleys 32 and 34 are connected to each other by a flexible strip 36 made, for example, from steel (foil) or from a composite material, acting as a connection means.

The strip 36 is fixed to the pulley 32 in such a way that, whatever the direction of rotation of the pulley 34 may be, the strip 36 can act on the ring 12 only in the direction of return of the control pedal 6 towards its position of rest. In the embodiment shown in the drawing, the ring 12 and therefore also the associated pulley 32, have an angular travel of the order of 60°, that is to say much less than 180°. In this case, there is a zone of the pulley 32 which never faces the pulley 34 and is always facing away from it. The flexible strip 36 therefore becomes fixed on such a zone tangentially to the pulley 32. When the ring 12 pivots following a depression of the control pedal 6, the flexible strip 36 winds flatly over a part of the periphery of the pulley 32, without forming folds. This flexible strip 36 is fixed in a similar way to the pulley 34. However, as the amplitude of the movement of this pulley 34 can be greater than 180°, the attachment zone of the flexible strip 36 is not necessarily facing away from the pulley 32. The thrust return pedal management device will ensure that the motor 28 drives the movement of the pulley 34 in such a way that the flexible strip 36 winds around the pulley 34 without forming folds.

The motor 28 acts on the pivoting spindle 30 by the intermediary of a reduction unit. For reasons of size, the axis of the motor 28 is not mounted parallel with but perpendicular to the axis of the pivoting spindle 30. Two stages of reduction are provided between the motor 28 and the pivoting spindle 30.

The electric motor 28 comprises an output shaft 38 integral with a pulley 40 of small diameter. A metal cable 48 connects this pulley 40 to a pulley of large diameter 42. Pulley 40 can be characterized as a first driving pulley, and cable 48 as a first cable. The latter is mounted such that it pivots on an intermediate spindle 44, parallel with the pivoting spindle 30 and the fixed spindle 14. Return pulleys 46 are provided for the cable 48 connecting the pulleys 40 and 42.

The intermediate spindle 44 also carries a pulley 50 of small diameter cooperating, by the intermediary of a cable 52, with a pulley of large diameter 54. This latter pulley is integral with the pivoting spindle 30. The pulley 50 can be characterized as a second driving pulley, and the cable 52 as a second cable.

Figure 4:
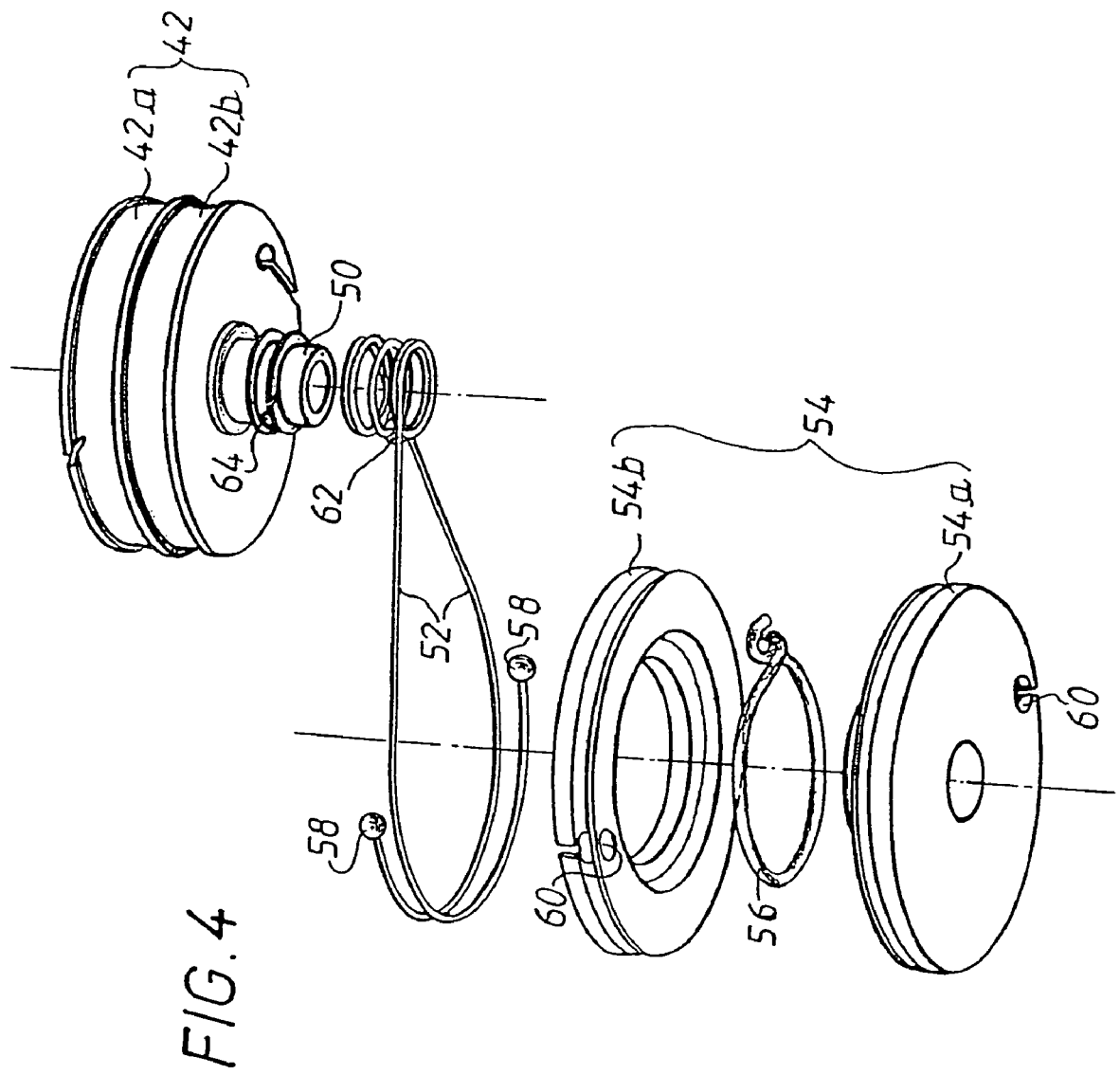
FIG. 4 is a perspective view on a bigger scale of a detail of a cable and pulleys transmission system.

Each cable 48, 52 corresponds to a reduction stage. Such a stage is shown in FIG. 4. It is the stage that makes use of the cable 52.

The pulley 54 consists of two half-pulleys 54a and 54b. These two half-pulleys are of identical diameter and are mounted coaxially on the pivoting spindle 30. A spring 56 acting torsionally connects the two half-pulleys 54a and 54b. A corresponding spring can interconnect half-pulleys 42a and 42b, with such springs characterized as first and second elastic elements.

Each end of the cable 52 is provided with a stop ball 58 and each half-pulley 54a and 54b is equipped with a corresponding recess 60 intended to receive a stop ball 58. Thus, one end of the cable 52 is fixed to the half-pulley 54a by the intermediary of a stop ball 58 and the corresponding recess 60. The cable then winds over a part of the periphery of that half-pulley 54a and is then wound by several turns around the pulley of small diameter 50 and is finally wound around a part of the periphery of the second half-pulley 54b, the other end of the cable 52 being fixed to this half-pulley 54b by the intermediary of the second stop ball 58 and of the corresponding recess 60. Because of the spring 56 and the degree of freedom of rotation between the two half-pulleys 54a and 54b, the cable 52 is always tensioned.

It will be noted on FIG. 4 that the cable 52 comprises a third stop ball 62. The latter is placed for example at mid-length on the cable 52. It takes its place in a corresponding recess 64 formed in the pulley 50. In this way, no slipping can impede the transmission of the movement of the motor 28 from the pulley 50 to the pulley 54 or, more precisely, the half-pulley 54a.

The transmission between the pulley 40 and the pulley 42 is carried out in the same way. As already mentioned above, in this transmission there are return pulleys 46 which, apart from the change of orientation, do not change the kinematics of the mechanism in any way. Another minor difference is that the cable 48 is not provided with a stop ball at its center. Such a ball and a corresponding recess could of course be provided but they are optional considering the slight forces applied to the cable 48 and therefore the very low risk of slipping of this cable around the pulley 40.

The position of the pivoting spindle 30 is measured by means of a potentiometer 66. The information provided by this potentiometer 66 makes it possible to know exactly the angular position of the pivoting spindle 30 and therefore of the pulley 34 also. This information, combined with that given by the Hall effect sensor 18, makes it possible to know the play present in the flexible strip 36.

The functioning of the thrust return pedal described above with reference to FIGS. 1 to 4 is therefore as follows.

This thrust return pedal can firstly function like a conventional pedal. It is assumed here that it is an accelerator pedal. It therefore suffices to position the pivoting spindle 30 in a position such that, whatever the position of the ring 12 and therefore of the pulley 32 may be, the flexible strip 36 is never tensioned. It therefore suffices to provide a flexible strip 36 of sufficient length. This length is calculated according to the distance separating the fixed spindle 14 and the pivoting spindle 30, the diameters of the pulleys 32 and 34 and also the positions of attachment of the flexible strip 36 on these pulleys.

Figure 5:
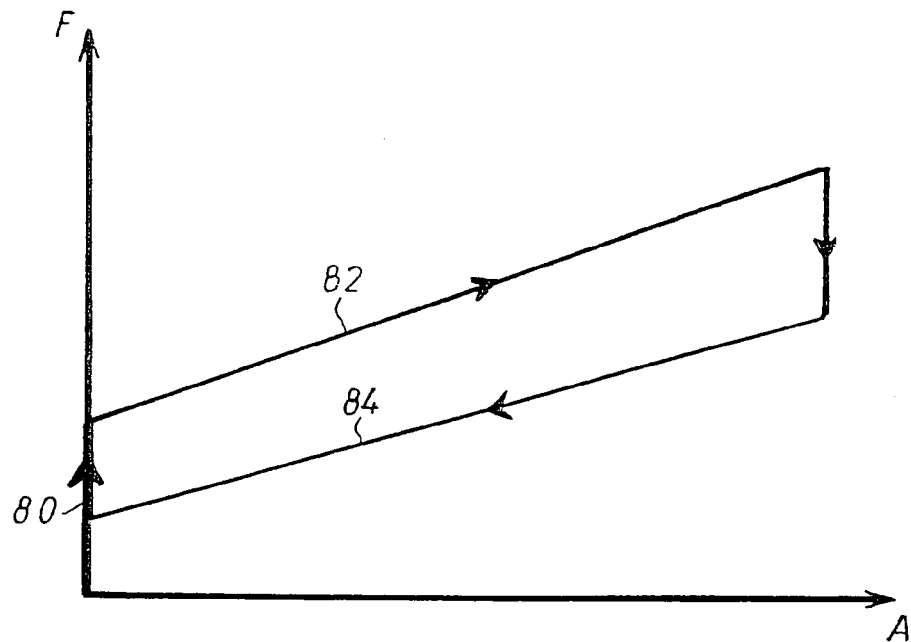
FIG. 5 is a response curve of a conventional pedal without thrust return.

The behavior of the control pedal 6, not equipped with a thrust return mechanism, is represented diagrammatically in FIG. 5. In this figure, the angle of depression A of the pedal which corresponds to the position of the control pedal 6 with respect to its spindle 8, a position directly proportional to the angle of rotation of the ring 12, is plotted along the horizontal axis. The force F applied by a driver's foot on the control pedal 6 is plotted along the vertical axis. In the curve seen in this FIG. 5 it appears that the force to be applied in order to actuate the control pedal 6 must initially (see reference 80) overcome the return force of the springs 20, intended to return said pedal to its position of rest, and then the law follows a linear form (see reference 82). When the control pedal 6 is released, the return to the position of rest also follows a linear law (see reference 84). The curve seen in FIG. 5 shows a hysteresis of the control pedal 6 due, in particular, to the friction produced between the cables 22 and the ring 12. This behavior is sought in order to increase the comfort and ergonomics of this control pedal 6.

When it is desired that the driver should feel a hard point during the depression of the pedal, the electric motor 28 is operated and the flexible strip 36 is tensioned in such a way that when the control pedal 6 arrives at the position where the hard point must appear, the flexible strip 36 is then tensioned. When the control pedal 6 therefore arrives in the position where the flexible strip 36 is just tensioned, in order to continue to depress the control pedal 6 it is necessary, on the one hand, to continue to overcome the return force of the springs 20 and, on the other hand, to cause the pivoting spindle 30 to pivot against the force applied to this spindle by the motor 28, which acts by the intermediary of the reduction means described above.

Figure 6:
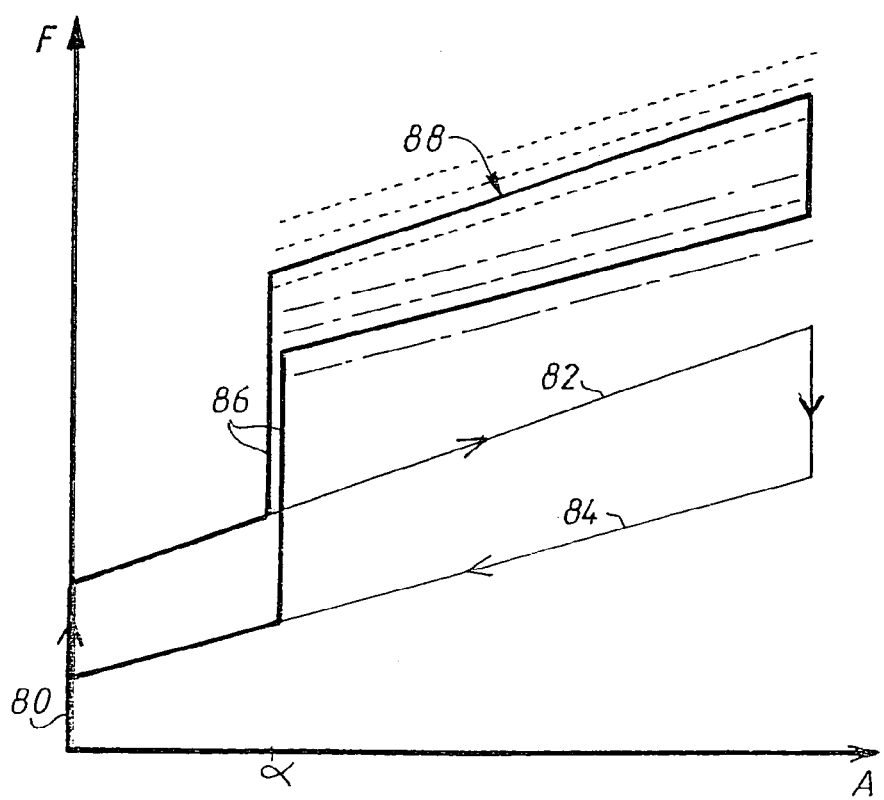
FIG. 6 is a response curve of the thrust return pedal shown in FIGS. 1 to 3.

A diagrammatic representation of behavior can again be seen in FIG. 6. In this figure, the behavior of a conventional pedal without thrust return such as shown in FIG. 5 has been plotted as a reminder. The new curve reveals the presence of a hard point for an angle of depression a of the control pedal 6. This hard point is represented on the curve by quasi-vertical portions 86 of the curve.

Beyond the hard point, the behavioral law follows a conventional linear form with the presence of hysteresis (see reference 88).

It is noted that the hard point appears without transition. The stiffness felt by the driver varies suddenly. In fact, in this case the thrust return mechanism works independently of the actuating mechanism. If the instruction given is to form a hard point when the angle of depression of the control pedal 6 is equal to $\alpha$, the electric motor 28 acts consequently in order to position the pivoting spindle 30 correctly. This adjustment is carried out as soon as the instruction value is known and it is carried out before the control pedal 6 reaches the corresponding position. The thrust return is therefore present when the control pedal 6 reaches the specified position and is not established solely when the control pedal reaches this position.

Once the flexible strip 36 is tensioned, by varying the value of the current feeding the electric motor 28, it is possible to vary the amplitude of the hard point. These different amplitudes are represented diagrammatically in FIG. 6 by dotted lines (depression of the pedal 6) and by dotted and dashed lines (release of the pedal 6). It is thus possible to create a hard point that can be overcome easily or a hard point that is difficult to overcome by the driver. This makes it possible to provide the driver with different kinds of information.

The thrust return mechanism according to the invention also makes it possible to make the driver feel vibrations in his foot, via the control pedal 6. In order to do this it suffices to supply the electric motor 28 with current in an alternating manner. An additional means is thus available for providing the driver with information.

In an extreme case, it is even possible to imagine that the motor applies to the pivoting spindle 30, and therefore to the flexible strip 36, sufficient force to bring the control pedal 6 back to its position of rest. This can for example be envisaged in cooperation with a safety device, for example detecting the driver falling asleep or other parameters.

It is noted that if, for one reason or another, the thrust return mechanism should fail, it would not in any case cause the control pedal 6 to be locked and it always allows the latter to be returned to its position of rest.

For the exceptional case in which a large force would be applied to the control pedal 6 whilst the flexible strip 36 is tensioned, in order not to transmit this large force to the electric motor 28 and to protect the latter, a declutching device 68 is provided between the pivoting spindle 30 and the electric motor 28. This declutching device 68 is for example disposed between the pivoting spindle 30 and the pulley 54. It is thus guaranteed that no torque greater than a predetermined torque can be transmitted to the electric motor 28.

In the thrust return pedal described above, the electric motor acts directly on the control pedal 6. Because of the original transmission by cables and pulleys used here, the electric motor has virtually no friction force to overcome and can be chosen from a range of small-sized motors whose cost is advantageously relatively low. Another transmission mode, for example by gears, would necessitate a more voluminous and more costly motor. The reduction is of course chosen such that the pressing force of the driver's foot on the control pedal 6, even when the driver decides to disregard the warning given by the thrust return mechanism, will not generate excess current in the motor and thus will not risk damaging it.

The unidirectional connection, achieved here by the flexible strip 36, between the thrust return mechanism and the control pedal actuating mechanism, allows the return springs 20 to act freely on the control pedal, independently of the thrust return mechanism. This guarantees, firstly, that only the depression of the control pedal beyond the hard point is mechanically braked, whereas the return to the position of rest is free of any braking, the flexible strip not opposing the working of the return springs. This total decoupling between the thrust return mechanism and the control pedal actuating mechanism allows great flexibility in the (electronic) management of the thrust return pedal according to the invention.

The thrust return pedal such as described above can be embodied in the form of a module that is simply screwed and connected at the place allocated for the accelerator pedal in a motor vehicle. This device can be sufficiently compact so as not to obstruct the adjacent brake control pedal.

This pedal also has the advantage that one and the same device makes it possible to have very variable behavioral laws: position of the hard point over the whole range of depression of the control pedal, amplitude of the hard point, sending of vibration to the control pedal, etc.

The present invention is not limited to the embodiment described above by way of non-limiting example. It also relates to all of the variant embodiments within the capabilities of those skilled in the art covered by the following claims.

Thus, the invention has a main application related to the accelerator pedals of motor vehicles. However, other applications can be envisaged: control lever for any type of machine, industrial or domestic, game joystick, etc.

The number of reduction stages is two in the example described above. A single stage or, on the contrary, several stages, can also be envisaged.

The flexible strip producing a unidirectional connection between the pedal actuating mechanism and the thrust return mechanism could be replaced for example by a free wheel.

The tension of the slack length in each reduction stage could be achieved in a different manner by using, as described above, split pulleys incorporating a tension spring.

The invention claimed is:

1. A thrust return mechanism intended for a thrust return pedal, comprising:
    an electric motor;
    a transmission connected to the motor; and
    a control member connected to the transmission;
    wherein the transmission comprises:
        a first driving pulley;
        a first set of coaxially rotatable half pulleys;
        a first cable having first and second ends connected to respective said coaxially rotatable half pulleys in the first set of coaxially rotatable half pulleys, a center portion of the first cable being wound around the first driving pulley;
    wherein the first set of coaxially rotatable half pulleys are interconnected with one another by a first elastic element, the first elastic element urging the first set of coaxially rotatable half pulleys in opposite rotational directions to one another so as to tension the first cable.

2. The thrust return mechanism as claimed in claim 1, wherein the first cable is wound by at least two turns around the first driving pulley.

3. The thrust return mechanism as claimed in claim 2, wherein the first cable is provided with an extra thickness disposed on the first driving pulley.

4. The thrust return mechanism as claimed in 2, wherein each of the first set of coaxially rotatable half pulleys comprises a recess in a periphery thereof, each of the first and second ends of the first cable comprises an end-piece, the end-pieces of the first cable being disposed in respective said recesses on the half pulleys.

5. The thrust return mechanism as claimed in claim 1, wherein the first cable is provided with an extra thickness disposed in a corresponding recess disposed on the first driving pulley.

6. The thrust return mechanism as claimed in 5, wherein each of the first set of coaxially rotatable half pulleys comprises a recess in a periphery thereof, each of the first and second ends of the first cable comprises an end-piece, the end-pieces of the first cable being disposed in respective said recesses on the half pulleys.

7. The thrust return mechanism as claimed in claim 1, characterized in that each cable end is provided with an end-piece placed in a corresponding recess formed at the periphery of one of the first coaxially rotatable half-pulleys.

8. A thrust return pedal comprising:
    a control device having a control member that moves between a raised position of rest and a position of maximum depression,
    a return means for returning the control member to the position of rest, and
    a thrust return mechanism designed to create a point of increased resistance during the depression of the control member, wherein the thrust return mechanism comprises a mechanism as claimed in claim 1.

9. The thrust return pedal as claimed in claim 8, wherein the thrust return mechanism is connected to the control device by a connection means, the connection means, thrust return mechanism, and the control device being constructed and arranged so that the thrust return mechanism can only urge the control device in the same direction as the return means.

10. The thrust return mechanism of claim 1, further comprising:
    a second driving pulley fixed to one of the first set of coaxially rotatable half pulleys;
    a second set of coaxially rotatable half pulleys;
    a second cable having first and second ends connected to respective said coaxially rotatable half pulleys in the second set of coaxially rotatable half pulleys, a center portion of the second cable being wound around the second driving pulley;
    wherein the second set of coaxially rotatable half pulleys are interconnected with one another by a second elastic element, the second elastic element urging the second set of coaxially rotatable half pulleys in opposite rotational directions to one another so as to tension the second cable.

11. The thrust return mechanism of claim 10, wherein the first driving pulley is connected to the electric motor.

12. The thrust return mechanism of claim 11, wherein one of the first set of coaxially rotatable half pulleys is connected to the control member.

* * * * *